United States Patent
Jain et al.

(10) Patent No.: US 11,868,693 B2
(45) Date of Patent: Jan. 9, 2024

(54) VERIFICATION PERFORMANCE PROFILING WITH SELECTIVE DATA REDUCTION

(71) Applicant: Siemens Industry Software Inc., Plano, TX (US)

(72) Inventors: Rohit Kumar Jain, Milpitas, CA (US); David Lowder, Molalla, OR (US); James Insley, Dundee, OR (US); Srinivasa Cherukumilli, San Ramon, CA (US)

(73) Assignee: Siemens Industry Software Inc., Plano, TX (US)

(*) Notice: Subject to any disclaimer, the term of this patent is extended or adjusted under 35 U.S.C. 154(b) by 330 days.

(21) Appl. No.: 17/236,606

(22) Filed: Apr. 21, 2021

(65) Prior Publication Data
US 2022/0343044 A1 Oct. 27, 2022

(51) Int. Cl.
*G06F 30/33* (2020.01)
*G06F 16/23* (2019.01)
*G06F 111/02* (2020.01)

(52) U.S. Cl.
CPC .......... *G06F 30/33* (2020.01); *G06F 16/2379* (2019.01); *G06F 2111/02* (2020.01)

(58) Field of Classification Search
CPC .. G06F 30/33; G06F 16/2379; G06F 2111/02; G06F 30/367
See application file for complete search history.

(56) References Cited

U.S. PATENT DOCUMENTS

| | | | | |
|---|---|---|---|---|
| 4,675,832 A | * | 6/1987 | Robinson | G06F 11/32 716/136 |
| 4,970,664 A | * | 11/1990 | Kaiser | G06F 30/3312 716/108 |
| 5,623,418 A | * | 4/1997 | Rostoker | G01R 31/318364 716/136 |
| 5,754,442 A | * | 5/1998 | Minagawa | G06F 30/33 703/19 |
| 10,204,187 B1 | * | 2/2019 | Farquharson | G06F 30/367 |
| 2004/0218440 A1 | * | 11/2004 | Kumar | G11C 29/16 365/202 |
| 2007/0113136 A1 | * | 5/2007 | Nakajima | G06F 30/367 714/738 |

(Continued)

*Primary Examiner* — Stacy Whitmore

(57) ABSTRACT

This application discloses a computing system implementing a design verification tool to perform functional verification on a circuit design describing an electronic device and collect samples of performance data during the functional verification. The computing system can also include a performance visualization tool to generate a profile presentation based on the samples of performance data. The profile presentation, when displayed, can annunciate portions of the circuit design corresponding to at least one performance hotspot. The performance visualization tool can receive a data reduction request based on the performance hotspot annunciated by the profile presentation. The data reduction request can identify a subset of the performance data in the profile presentation. The performance visualization tool can generate a refined profile presentation based, at least in part, on the samples of performance data and the subset of the performance data identified in the data reduction request.

17 Claims, 4 Drawing Sheets

(56) References Cited

U.S. PATENT DOCUMENTS

| | | | |
|---|---|---|---|
| 2009/0125290 A1* | 5/2009 | Chatterjee | G06F 30/33 |
| | | | 703/13 |
| 2015/0213174 A1* | 7/2015 | Meyer | G01R 31/31835 |
| | | | 703/16 |
| 2018/0225394 A1* | 8/2018 | Verma | G06F 30/33 |
| 2019/0114387 A1* | 4/2019 | Wolfe | B64F 5/40 |
| 2019/0121932 A1* | 4/2019 | Saunders | G06F 30/331 |
| 2020/0074040 A1* | 3/2020 | Amer | G06F 30/398 |
| 2023/0142664 A1* | 5/2023 | Ackerman | G06Q 10/00 |
| | | | 706/50 |

* cited by examiner

VERIFICATION PERFORMANCE PROFILING WITH SELECTIVE DATA REDUCTION

TECHNICAL FIELD

This application is generally related to electronic design automation and, more specifically, to verification performance profiling with selective data reduction.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Design Language (HDL), such as System Verilog or Very high speed integrated circuit Hardware Design Language (VHDL).

The logic of the electronic system can be analyzed to confirm that it will accurately perform the functions desired for the electronic system, sometimes referred to as "functional verification." Design verification tools can perform functional verification operations, such as simulating, emulating, and/or prototyping the logical design. For example, when a design verification tool simulates the logical design, the design verification tool can provide transactions or sets of test vectors, for example, generated by a simulated test bench, to the simulated logical design. The design verification tools can determine how the simulated logical design responded to the transactions or test vectors, and verify, from that response, that the logical design describes circuitry to accurately perform functions.

As the logical designs increase in size and verification runtime becomes longer, functional verification speed-up can be obtained by either making design verification tool faster or by writing logical design more efficiently. Many design verification tools have integrated performance profiling capability that can collect runtime performance data of the functional verification operations performed by the design verification tools and provide analysis on the performance data to locate performance hotspots in the functional verification of the logical design. The performance profiling tools typically organize the collected data for whole designs and for full duration of the simulation run, and then provide the organized data with the performance hotspots to design teams for manual interpretation and root cause analysis. With the increase in size of the logical designs, however, the amount of data provided to the design teams can render manual interpretation impractical or impossible, and attempts to filter the organized data into a manageable size are often complicated by the multiple inter-relationships between design elements in the collected data, which obfuscates the root cause of the performance hotspot.

SUMMARY

This application discloses a computing system implementing a design verification tool to perform functional verification on a circuit design describing an electronic device, for example, performed by at least one of a digital simulator, an analog simulator, a hardware-based emulator, or a hardware-based prototyping system. The design verification tool can collect samples of performance data during the functional verification, for example, periodically during the functional verification of the circuit design or in response to one or more events occurring during the functional verification of the circuit design. The samples of the performance data can include one or more of a simulation time, a design instance of the circuit design being executed, a design unit of the circuit design being executed, a function of the circuit design being executed, a call stack of the functional verification, or a code type for the circuit design.

The computing system can also include a performance visualization tool to generate a profile presentation based on the samples of performance data. The profile presentation, when displayed, can annunciate portions of the circuit design corresponding to at least one performance hotspot. In some embodiment, the performance visualization tool can generate the profile presentation by identifying design elements in each of the samples of the performance data, and building a hierarchical tree for each of the types of the identified design elements. Each of the hierarchical trees can includes counter values associated with a presence of the design elements in the samples of the performance data.

The performance visualization tool can receive a data reduction request based on the performance hotspot annunciated by the profile presentation. The data reduction request can identify a subset of the performance data in the profile presentation. The performance visualization tool can generate a refined profile presentation based, at least in part, on the samples of performance data and the subset of the performance data identified in the data reduction request. In some embodiments, the performance visualization tool can generate the refined profile presentation by identifying design elements in each of the samples of the performance data, and selectively building hierarchical trees for the types of the design elements identified in the data reduction request, which includes selectively incrementing counter values in the hierarchical trees based on a presence of the design elements corresponding to the subset of the performance data identified in the data reduction request. Embodiments will be described in greater detail below.

DETAILED DESCRIPTION

Illustrative Operating Environment

Figure 1:
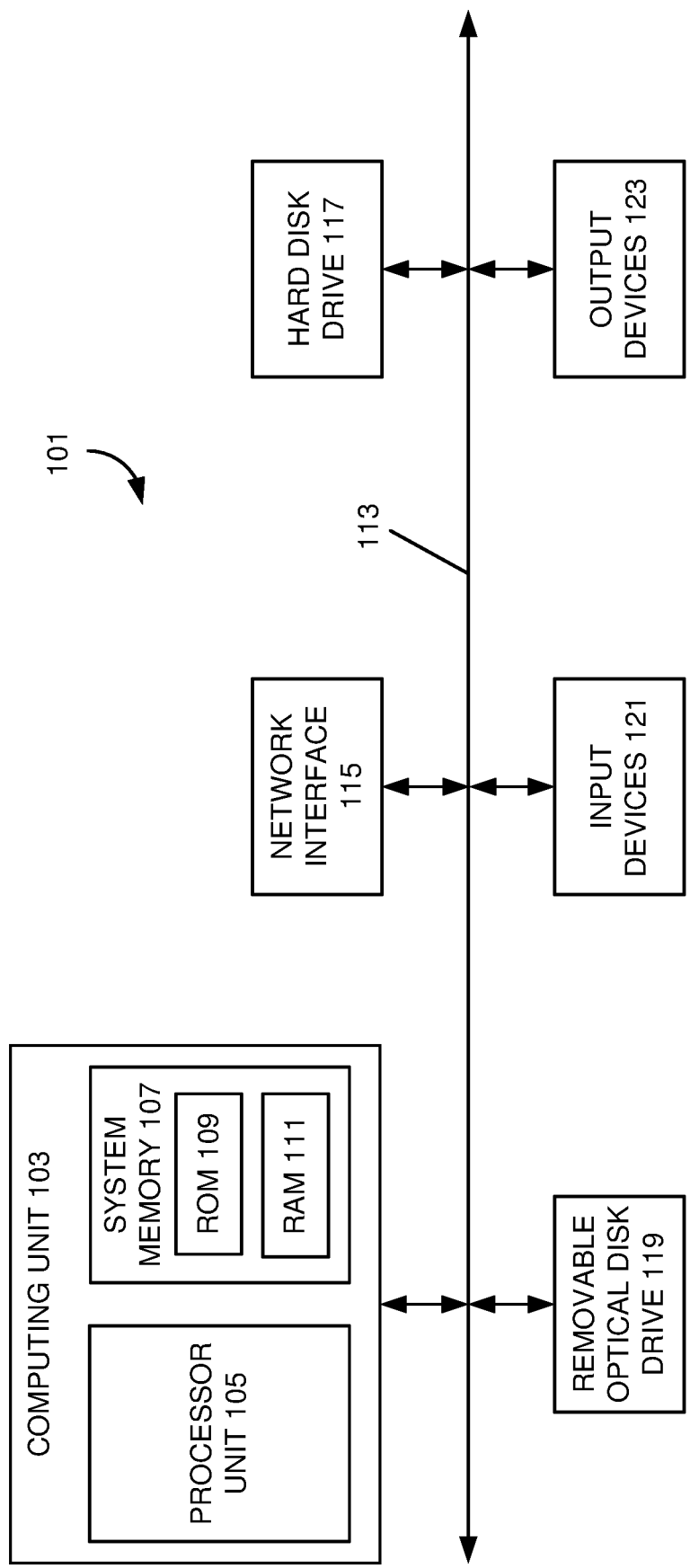
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
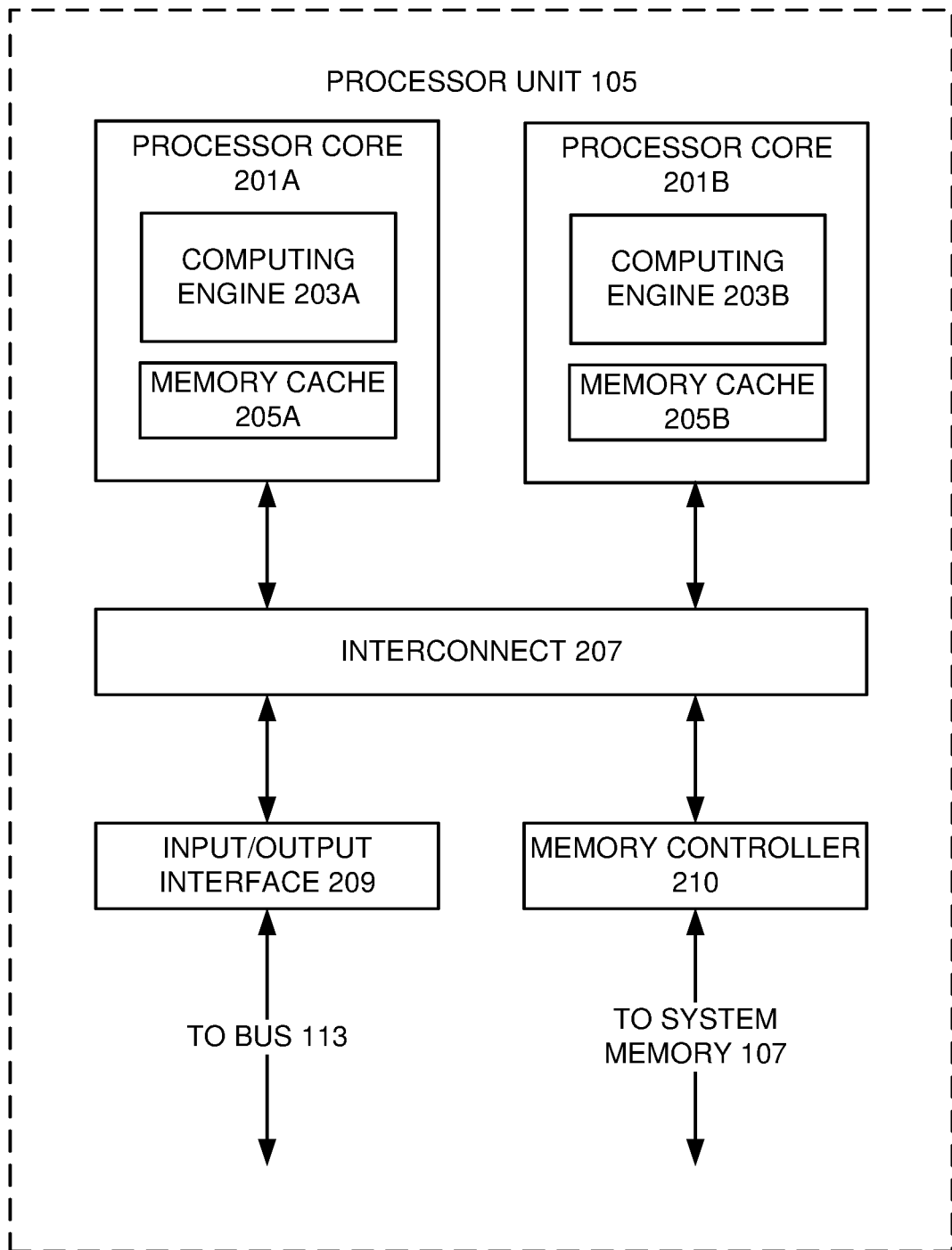

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Verification Performance Profiling with Selective Data Reduction

Figure 3:
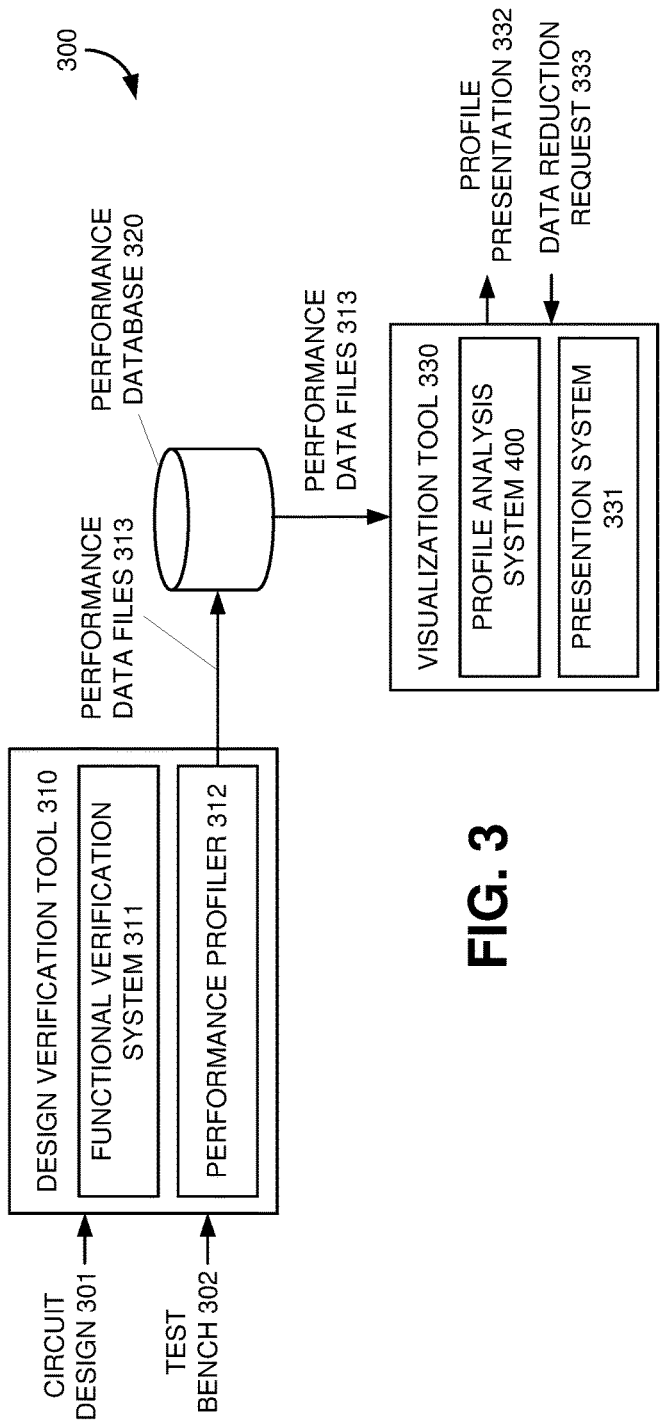
FIG. 3 illustrates an example design verification system 300 having performance profiling using data reduction that may be implemented according to various embodiments.

FIG. 3 illustrates an example design verification system 300 having performance profiling using data reduction that may be implemented according to various embodiments. Referring to FIG. 3, the design verification system 300 can include a design verification tool 310, for example, implemented with a computer network 101 described above with reference to FIG. 1, to functionally verify a circuit design 301 describing an electronic device. In some embodiments, the circuit design 301 can describe the electronic device both in terms of an exchange of data signals between components in the electronic device, such as hardware registers, flip-flops, combinational logic, or the like, and in terms of logical operations that can be performed on the data signals in the electronic device. The circuit design 301 can model the electronic device at a register transfer level (RTL), for example, with code in a hardware description language (HDL), such as System Verilog, Very high speed integrated circuit Hardware Design Language (VHDL), System C, or the like.

The functional verification system 311 can include at least one of a simulation tool, a hardware-based emulation tool, a hardware-based prototyping tool, or the like, to perform the functional verification operations on the circuit design 301. The simulation tool can perform the functional verification operations with one or more processors configured to simulate the circuit design 301. The emulation tool and the prototyping tool can perform functional verification operations with configurable hardware, such as Field Programmable Gate Arrays (FPGAs), configured to implement electronic device described by the circuit design 301.

The design verification tool 310 also can utilize a test bench 302 to generate test stimulus during functional verification operations, such as clock signals, activation signals, power signals, control signals, data signals or the like. The test stimulus, when grouped, may form test bench transactions capable of prompting operation of the circuit design 301 being functionally verified by the design verification tool 300. In some embodiments, the test bench 302 can be written in an object-oriented programming language, for example, System Verilog or the like, which, when executed during elaboration, can dynamically generate test bench components for verification of the circuit design. A methodology library, for example, a Universal Verification Methodology (UVM) library, an Open Verification Methodology (OVM) library, an Advanced Verification Methodology (AVM) library, a Verification Methodology Manual (VMM) library, or the like, can be utilized as a base for creating the test bench. The functional verification system 311 can generate output corresponding to the operations of the circuit design 301 in response to the test stimulus during the functional verification operations, which can be compared to expected output of the circuit design 301.

The design verification tool 310 can include a performance profiler 312 to collect samples of performance data associated with the operation of the functional verification system 311 and generate performance data files 313 corresponding to the collected samples of the performance data. In some embodiments, the performance profiler 312 can collect the samples of performance data for the functional verification system 311 periodically or synchronously, for example, utilizing an interrupt-based procedure to capture samples of the functional verification system 311 at a predetermined frequency. The performance profiler 312 also can collect the samples of performance data for the functional verification system 311 asynchronously, for example, utilizing an event-based procedure to capture samples of the functional verification system 311.

The performance profiler 312 can generate the performance data files 313 by organizing the performance data by different design elements associated with the functional verification of the circuit design 301 and arranging the organized data relative to the samples in the performance data files 313. In some embodiments, the design elements can include one or more of a verification time, a design instance, a design unit, a hardware description language process, a hardware description language task and function, a source file, a call stack, or the like. The verification time can correspond to a duration of simulation, emulation, or prototyping activity performed by the design verification system 311. The design instance time can represent verification activity for each hardware description language design instance in the circuit design 301 and within its hierarchy. The design unit can represent verification activity for each hardware description language design unit in the circuit design 301. The hardware description language process can represent verification activity for each hardware description language process associated with the circuit design 301. The hardware description language task and function can represent verification activity for each hardware description language task and function associated with the circuit design 301. The source file can represents verification activity for each hardware description language file associated with the circuit design 301. The call stack can represent an internal list of executable code portions during functional verification of the circuit design 301.

The design verification tool 310 can store the performance data files 313 in performance database 320, for example, after the functional verification system 311 has completed a verification run of the circuit design 301. In some embodiments, the performance data files 313 can be uncollated sample data, for example, not already arranged and organized by design element, but instead left relative to the sample of the collected performance data. Although the performance database 320 is shown in FIG. 3 to be external to the design verification tool 310, in some embodiments, the design verification tool 310 can include the performance database 320.

The design verification system 300 can include a visualization tool 330 to receive the performance data files 313 from the performance database 320 and to generate one or more profile presentations 332 based on the samples of performance data in the performance data files 313. The profile presentation 332, when displayed, can be configured to annunciate portions of the circuit design 301 corresponding to at least one performance hotspot for the functional verification system 311. For example, when the functional verification system 311 includes a simulation tool, the profile presentation 332 can present the performance data to show a performance hotspot as a design unit or design instance in the circuit design 301 being functionally verified that consumed the most simulation time or had the most simulation activity.

The visualization tool 330 can include a profile analysis system 400 to identify design elements in each of the samples of the performance data in the performance data files 313 and to arrange and collate the performance data according to the identified design elements. In some embodiments, the profile analysis system 400 can build a flat representation or hierarchical trees for the types of the identified design elements and identify a frequency associated with the presence of the design elements in the performance data files 313. In some embodiments, the profile analysis system 400 can include an application programming interface (API) to interface between the performance database 320 and the visualization tool 330.

The visualization tool 330 can include a presentation system 331 to generate the profile presentations 332, for example, by inserting the flat representation or the hierarchical trees built by the profile analysis system 400, and prompt a display device to present the profile presentations 332. In some embodiments, the profile analysis system 400 can generate default hierarchical trees from the performance data files 313, which the presentation system 331 can initially present via the display device. The default hierarchical trees can each include counter values for each node of the hierarchical trees. The counter values can correspond to design elements in the samples of the performance data, for example, a number of the samples collected when a corresponding node in one of the hierarchical trees was active or had code executing. In some embodiments, the performance hotspot can correspond to those counter values in the nodes in the hierarchical trees with the profile presentation 332 having higher counts for verification activity during the function verification of the circuit design 301. The default hierarchical trees can provide a full view of the performance data captured during functional verification of the circuit design 301. In some embodiments, the presentation system 331 also can annunciate performance hotspots in the profile presentation 332 utilizing the flat representation, for example, by ranking nodes and combined nodes in the flat representation by their corresponding counter values and then utilizing a group or subset of the lines or functions having the highest counter values in the ranking of the nodes and combined nodes to correspond to the performance hotspots.

The visualization tool 330 also can receive a data reduction request 333 which identifies a subset of the performance data in the performance data files 313. In some embodiments, the data reduction request 333 can be received based on the performance hotspot annunciated by the profile presentation 332. For example, the profile presentation 332 may indicate a certain design unit in the circuit design 301 as corresponding to a performance hotspot during the function verification of the circuit design 301, and the data reduction request 333 can identify one or more functions or processes performed by the design unit to further investigate with a new or refined version of the profile presentation 332. Since the identification of which function or process may be contributing to the design unit being a performance hotspot was obfuscated in the default hierarchical trees, the profile analysis system 400 can generate a new set of hierarchical trees or flat representations from the performance data files 313 based on the data reduction request, which can highlight performance hotspots amongst interrelated design elements.

The data reduction request 332, in some embodiments, can identify performance data in the profile presentation 332 to include in a subsequent profile presentation. When the identification of the performance data corresponds to a hierarchical tree in the profile presentation 332, in some embodiments, the profile analysis tool 400 can include all portions of the hierarchical tree below the identified performance data as included in the data reduction request 332. The profile analysis system 400 can generate a new set of hierarchical trees or flat representations from the performance data files 313, which includes counter values corresponding to the identified performance data included in the data reduction request during the generation process. The data reduction request 332, in some embodiments, can identify performance data in the profile presentation 332 to exclude in a subsequent profile presentation. The profile analysis system 400 can generate a new set of hierarchical trees or flat representations from the performance data files 313, which excludes counter values corresponding to the identified performance data included in the data reduction request during the generation process.

The data reduction request 332, in some embodiments, can identify multiple portions of the performance data in one hierarchical tree or flat representation in the profile presentation 332, for example, two design instances in the same hierarchical tree or flat representation, or one instance and one design unit in the same hierarchical tree or flat representation, or one design unit and one function in the same hierarchical tree or flat representation, two functions in the same hierarchical tree or flat representation, or the like. The profile analysis system 400 can generate a new set of hierarchical trees or flat representations from the performance data files 313 based on the identified portions of the performance data in the data reduction request, for example, utilizing an OR operation during the generation process to include occurrences of the identified performance data.

The data reduction request 332, in some embodiments, can identify multiple portions of the performance data in different hierarchical trees and/or flat representations in the profile presentation 332. The profile analysis system 400 can generate a new set of hierarchical trees or flat representations from the performance data files 313 based on the identified portions of the performance data in the data reduction request, for example, utilizing an AND operation during the generation process to include samples when the different portions of the identified performance data appeared in the sample.

By having the performance profiler 312 store performance data relative to the sample into the performance database 320 rather than one collated by design elements, the visualization tool 330 can generate and re-generate hierarchical trees of the performance data with varying degrees of refinement or granularity and allow visibility into a multitude of design element interrelationships revealing performance hotspots obfuscated in collated data. Embodiments of the profile analysis system 400 will be described below with reference to FIG. 4 in greater detail.

Figure 4:
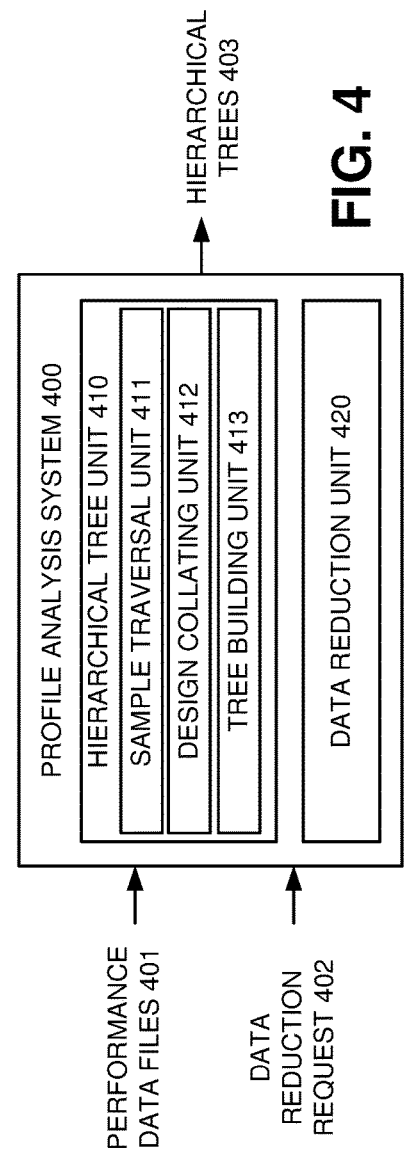
FIG. 4 illustrates an example profile analysis system to implement data reduction for performance profiling of a design verification tool, which may be implemented according to various embodiments.

FIG. 4 illustrates an example profile analysis system 400 to implement data reduction for performance profiling of a design verification tool, which may be implemented according to various embodiments. Referring to FIG. 4, a profile analysis system 400 can include a hierarchical tree unit 410 to generate hierarchical trees 403 with varying levels of granularity utilizing performance data files 401 and one or more data reduction requests 402. The performance data files 401 correspond to samples of performance data associated with the operation of the design verification tool during functional verification of a circuit design. The performance data files 401 can organize the performance data by different design elements associated with the functional verification of the circuit design and be arranged relative to the samples. In some embodiments, the performance data files 401 can correspond to samples of performance data that were collected periodically or synchronously, for example, utilizing an interrupt-based procedure to capture samples of the design verification tool at a predetermined frequency. The performance data files 401 can correspond to samples of performance data that were collected asynchronously, for example, utilizing an event-based procedure to capture samples of the design verification tool.

The hierarchical tree unit 410 can include a sample traversal unit 411 to analyze the samples of the performance data in the performance data files 401 to identify a presence of the design elements in the samples of the performance data. In some embodiments, the design elements can include one or more of a verification time, a design instance, a design unit, a hardware description language process, a hardware description language task and function, a source file, a call stack, or the like. The sample traversal unit 411 can analyze each sample individually to identify the design elements corresponding to the performance data.

The hierarchical tree unit 410 can include a design collating unit 412 can organize the performance data according to the design elements identified by the sample traversal unit 411. The design collating unit 412, in some embodiments, can utilize the identified design elements to identify which hierarchical trees to build and a structure of the hierarchical trees. The design collating unit 412 also can collate the identified design elements to the different hierarchical trees. For example, when a sample identifies a specific design instance performing a specific function, the design collating unit 412 can collate the specific design instance to a hierarchical tree for that specific function and collate the specific function to a hierarchical tree for that specific design instance and increment counter values which represent the number of samples for that instance.

The hierarchical tree unit 410 can include a tree building unit 413 to build hierarchical trees for the different types of the identified design elements. Each hierarchical tree can include nodes corresponding to the design elements in the performance data, which can be organized according to the hierarchical structure of the circuit design under verification. Each of the nodes in the hierarchical tree can include a bin or counter to accumulate a value corresponding to the presence of the design element in the performance data files. The tree building unit 413 can utilize the design elements identified by the sample traversal unit 411 add nodes to hierarchical trees when one was not previously added and increment the value in the bin or counter. The resulting hierarchical trees 403 built by the tree building unit 413 can include a hierarchical set of node representing design elements in sample data along with counters corresponding to a number of times the specific design element was present in the samples of the performance data.

The profile analysis system 400 can receive the data reduction request 402 which identifies a subset of the performance data in the performance data files. In some embodiments, the data reduction request 402 can be received by the data reduction unit 420 after the hierarchical tree unit 410 has developed a set of the hierarchical trees 403 and a user or design team has requested to review a new set of hierarchical trees with a specific relationship between design elements, for example, not exposed in the original set of the hierarchical trees 403.

The profile analysis system 400, in response to the data reduction request 402, can initiate the process of generating the new set of the hierarchical trees that will be populated with the subset of the performance data based on the data reduction request 402. The hierarchical tree unit 410 can perform the sample traversal and the performance data collating similar as before, but once the tree building unit 413 decides to populate a hierarchical tree 403 with a new node and/or an indication of the presence of a design element in an existing node, the profile analysis system 400 can utilize a data reduction unit 420 to selectively exclude the collated information based on the data reduction request 402. This selective exclusion can allow the profile analysis system 400 to generate the hierarchical trees that expose interrelationships in the sampled performance data that were obfuscated by the original hierarchical trees 403 generated by the profile analysis system 400.

Figure 5:
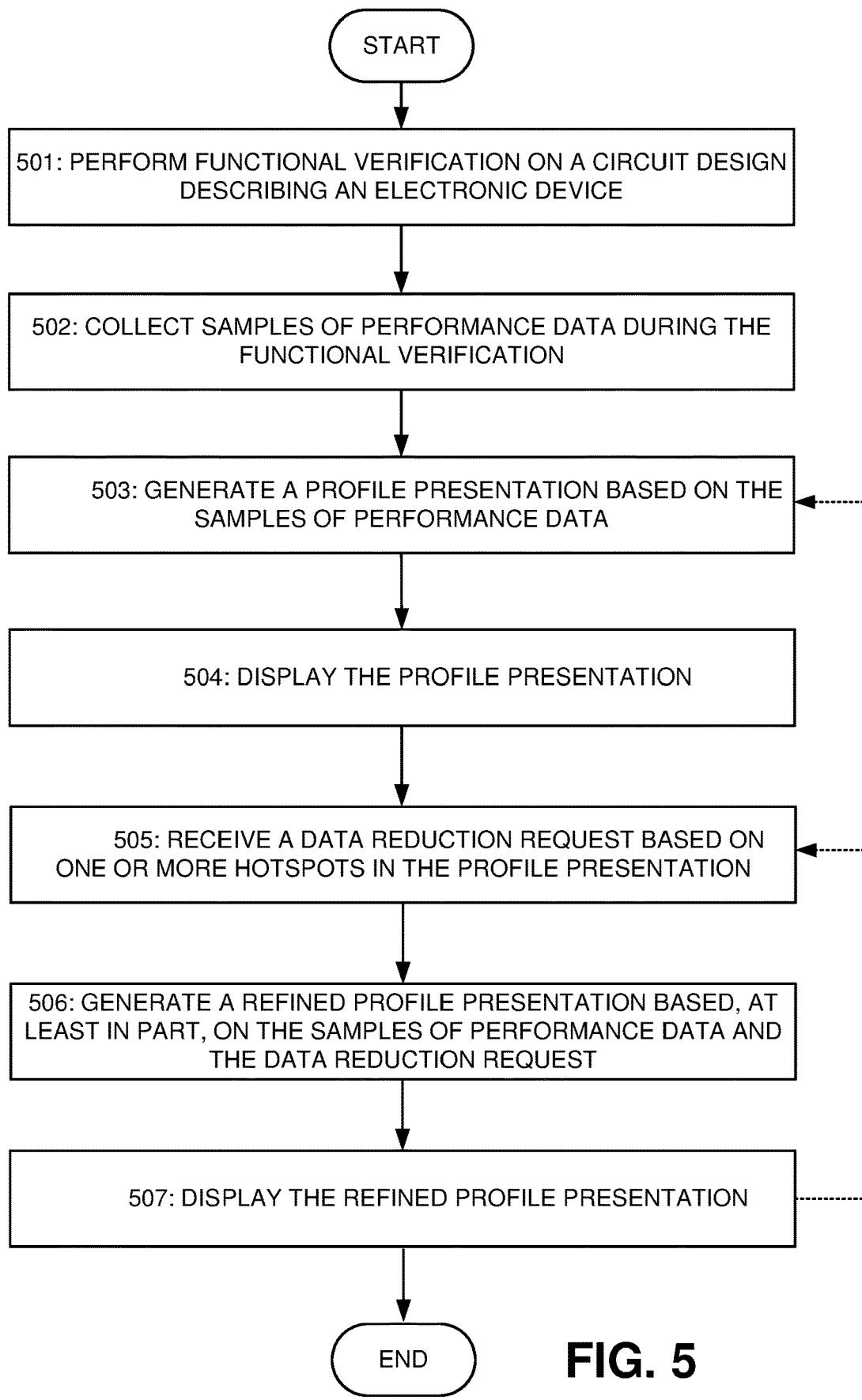
FIG. 5 illustrates an example flowchart implementing performance profiling of a design verification tool using data reduction, which may be implemented according to various embodiments.

FIG. 5 illustrates an example flowchart implementing performance profiling of a design verification tool using data reduction, which may be implemented according to various embodiments. Referring to FIG. 5, in a block 501, a computing system implementing a design verification tool can perform functional verification on a circuit design describing an electronic device using a test bench to generate test stimulus during functional verification operations. The computing system implementing the design verification tool can include at least one of a simulation tool, a hardware-based emulation tool, a hardware-based prototyping tool, or the like, to perform the functional verification operations on the circuit design. In some embodiments, the circuit design can describe the electronic device both in terms of an exchange of data signals between components in the electronic device, such as hardware registers, flip-flops, combinational logic, or the like, and in terms of logical operations that can be performed on the data signals in the electronic device. The circuit design can model the electronic device at a register transfer level (RTL), for example, with code in a hardware description language (HDL), such as System Verilog, Very high speed integrated circuit Hardware Design Language (VHDL), System C, or the like. The test stimulus generated using the test bench during functional verification operations, such as clock signals, activation signals, power signals, control signals, data signals or the like, may be grouped to form test bench transactions capable of prompting operation of the circuit design being functionally verified by the design verification tool. In some embodiments, the test bench can be written in an object-oriented programming language, for example, System Verilog or the like, which, when executed during elaboration, can dynamically generate test bench components for verification of the circuit design. A methodology library, for example, a Universal Verification Methodology (UVM) library, an Open Verification Methodology (OVM) library, an Advanced Verification Methodology (AVM) library, a Verification Methodology Manual (VMM) library, or the like, can be utilized as a base for creating the test bench. The computing system implementing the design verification tool can generate output corresponding to the operations of the circuit design in response to the test stimulus during the functional verification operations, which can be compared to expected output of the circuit design.

In a block 502, a computing system implementing a performance profiling tool can collect samples of performance data during the functional verification. In some embodiments, the computing system implementing the performance profiling tool can collect the samples of performance data for the design verification tool periodically, for example, utilizing an interrupt-based procedure to capture samples of the design verification tool. The computing system implementing the performance profiling tool also can collect the samples of performance data for the design verification tool asynchronously, for example, utilizing an event-based procedure to capture samples of the design verification tool.

In some embodiments, the computing system implementing the performance profiling tool can generate performance data files corresponding to the collected samples of the performance data, for example by organizing the performance data by different design elements associated with the functional verification of the circuit design and arranging the organized data relative to the samples in the performance data files. The design elements can include one or more of a verification time, a design instance, a design unit, a hardware description language process, a hardware description language task and function, a source file, a call stack, or the like.

In a block 503, a computing system implementing a profile analysis tool can generate a profile presentation based on the samples of performance data, for example, in the performance data files generated by the computing system implementing the performance profiling tool. The computing system implementing the profile analysis tool can identify design elements in each of the samples of the performance data in the performance data files and arrange and collate the performance data according to the identified design elements. In some embodiments, the computing system implementing the profile analysis tool can build hierarchical trees for the types of the identified design elements and identify a frequency associated with the presence of the design elements in the performance data files. The computing system implementing the profile analysis tool can insert the hierarchical trees into the profile presentations.

In a block 504, a display device can display the profile presentation. The computing system implementing the profile analysis system can prompt the display device to present the profile presentations. The profile presentation, when displayed, can be configured to annunciate portions of the circuit design corresponding to at least one performance hotspot for the design verification tool.

In a block 505, the computing system implementing the profile analysis tool can receive a data reduction request based on one or more hotspots in the profile presentation. The data reduction request can identify a subset of the performance data in the performance data files to include or exclude from a subsequent generation of the hierarchical trees from the performance data files.

In a block 506, the computing system implementing the profile analysis tool can generate a refined profile presentation based, at least in part, on the samples of performance data and the data reduction request. In some embodiments, the computing system implementing the profile analysis tool re-generate the profile presentation from the performance data files, similarly as performed in the block 503 above, except the computing system implementing the profile analysis tool can selectively exclude information based on the data reduction request. For example, if the default hierarchical trees annunciated a design unit was associated with a performance hotspot, the data reduction request could identify one or more functions performed by the design unit to use when rebuilding the hierarchical trees. The computing system implementing the profile analysis tool can selectively exclude any performance data from being populated into the hierarchical tree that was not associated with the one or more functions identified in the data reduction request. The resulting refined or re-built tree would be capable of annunciating the performance data associated with the combination of the design unit and the identified function(s). By allowing selective exclusion of related functions, process, or other design elements, the computing system implementing the profile analysis tool can allow obfuscated root causes of performance hotspots to be exposed.

In a block 507, the display device can display the refined profile presentation. The computing system implementing the profile analysis system can prompt the display device to present the profile presentations. The refined profile presentation, when displayed, can be configured to annunciate portions of the circuit design corresponding to at least one performance hotspot for the design verification tool.

In some embodiments, the computing system implementing the profile analysis tool can receive one or more additional data requests based on the refined profile presentation. For example, the profile analysis tool can receive another data reduction request based on one or more hotspots in the refined profile presentation, which can return the process to the block 505. In another example, the profile analysis tool can receive a data request to return to the profile presentation, e.g., to undue the previous refinement in the block 506, and thus the process can return to the block 503, where the profile analysis tool can generate the profile presentation based on the samples of performance data.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims. For example, while some of the specific terminology has been employed above to refer to electronic design automation processes, it should be appreciated that various examples may be implemented using any electronic system.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   collecting, by a computing system, samples of performance data during functional verification of a circuit design describing an electronic device;
   generating, by the computing system, a profile presentation based on the samples of performance data, wherein the profile presentation, when displayed, is configured to annunciate portions of the circuit design corresponding to at least one performance hotspot, wherein generating the profile presentation further comprises:
      identifying design elements in each of the samples of the performance data; and
      building a hierarchical tree or flat representations for each type of the identified design elements, wherein each of the hierarchical trees or flat representations includes counter values associated with a presence of the design elements in the samples of the performance data;
   receiving, by the computing system, a data reduction request based on the performance hotspot annunciated by the profile presentation, wherein the data reduction request is configured to identify a subset of the performance data in the profile presentation; and
   generating, by the computing system, a refined profile presentation based, at least in part, on the samples of performance data and the subset of the performance data identified in the data reduction request.

2. The method of claim 1, wherein generating the refined profile presentation further comprises selectively building hierarchical trees or flat representations for each type of the design elements identified in the data reduction request, which includes selectively incrementing counter values in the hierarchical trees or the flat representations based on a presence of the design elements corresponding to the subset of the performance data identified in the data reduction request.

3. The method of claim 1, wherein collecting the samples of the performance data is performed periodically during the functional verification of the circuit design or in response to one or more events occurring during the functional verification of the circuit design.

4. The method of claim 1, wherein the samples of the performance data includes one or more of a simulation time, a design instance of the circuit design being executed, a design unit of the circuit design being executed, a function of the circuit design being executed, a call stack of the functional verification, or a code type for the circuit design.

5. The method of claim 1, further comprising performing, by the computing system, the functional verification on the circuit design describing the electronic device.

6. The method of claim 5, wherein the functional verification of the circuit design is performed by at least one of a digital simulator, an analog simulator, a hardware-based emulator, or a hardware-based prototyping system.

7. An apparatus comprising at least one computer-readable memory device storing instructions configured to cause one or more processing devices to perform operations comprising:
   collecting samples of performance data during functional verification of a circuit design describing an electronic device;
   generating a profile presentation based on the samples of performance data, wherein the profile presentation, when displayed, is configured to annunciate portions of the circuit design corresponding to at least one performance hotspot, wherein generating the profile presentation further comprises:
      identifying design elements in each of the samples of the performance data; and
      building a hierarchical tree or flat representations for each type of the identified design elements, wherein each of the hierarchical trees or flat representations includes counter values associated with a presence of the design elements in the samples of the performance data;
   receiving a data reduction request based on the performance hotspot annunciated by the profile presentation, wherein the data reduction request is configured to identify a subset of the performance data in the profile presentation; and
   generating a refined profile presentation based, at least in part, on the samples of performance data and the subset of the performance data identified in the data reduction request.

8. The apparatus of claim 7, wherein the instructions are configured to cause one or more processing devices to perform operations further comprising generating the refined profile presentation by selectively building hierarchical trees or flat representations for each type of the design elements identified in the data reduction request, which includes selectively incrementing counter values in the hierarchical trees or the flat representations based on a presence of the design elements corresponding to the subset of the performance data identified in the data reduction request.

9. The apparatus of claim 7, wherein collecting the samples of the performance data is performed periodically during the functional verification of the circuit design or in response to one or more events occurring during the functional verification of the circuit design.

10. The apparatus of claim 7, wherein the samples of the performance data includes one or more of a simulation time, a design instance of the circuit design being executed, a design unit of the circuit design being executed, a function of the circuit design being executed, a call stack of the functional verification, or a code type for the circuit design.

11. The apparatus of claim 7, wherein the instructions are configured to cause one or more processing devices to perform operations further comprising performing the functional verification on the circuit design describing the electronic device.

12. The apparatus of claim 11, wherein the functional verification of the circuit design is performed by at least one of a digital simulator, an analog simulator, a hardware-based emulator, or a hardware-based prototyping system.

13. A system comprising:
   a memory system configured to store computer-executable instructions; and
   a computing system, in response to execution of the computer-executable instructions, is configured to:

collect samples of performance data during functional verification of a circuit design describing an electronic device;

generate a profile presentation based on the samples of performance data, wherein the profile presentation, when displayed, is configured to annunciate portions of the circuit design corresponding to at least one performance hotspot, wherein generating the profile presentation further comprises:

identifying design elements in each of the samples of the performance data; and building a hierarchical tree or flat representations for each type of the identified design elements, wherein each of the hierarchical trees or flat representations includes counter values associated with a presence of the design elements in the samples of the performance data;

receive a data reduction request based on the performance hotspot annunciated by the profile presentation, wherein the data reduction request is configured to identify a subset of the performance data in the profile presentation; and generate a refined profile presentation based, at least in part, on the samples of performance data and the subset of the performance data identified in the data reduction request.

14. The system of claim 13, wherein the computing system, in response to execution of the computer-executable instructions, is further configured to generate the refined profile presentation by selectively building hierarchical trees or flat representations for each type of the design elements identified in the data reduction request, which includes selectively incrementing counter values in the hierarchical trees or the flat representations based on a presence of the design elements corresponding to the subset of the performance data identified in the data reduction request.

15. The system of claim 13, wherein the computing system, in response to execution of the computer-executable instructions, is further configured to collect the samples of the performance data periodically during the functional verification of the circuit design or in response to one or more events occurring during the functional verification of the circuit design.

16. The system of claim 13, wherein the samples of the performance data includes one or more of a simulation time, a design instance of the circuit design being executed, a design unit of the circuit design being executed, a function of the circuit design being executed, a call stack of the functional verification, or a code type for the circuit design.

17. The system of claim 13, wherein the computing system, in response to execution of the computer-executable instructions, is further configured to perform the functional verification on the circuit design describing the electronic device, wherein the functional verification of the circuit design is performed by at least one of a digital simulator, an analog simulator, a hardware-based emulator, or a hardware-based prototyping system.

* * * * *